W. F. FOLMER.
PHOTOGRAPHIC CAMERA.
APPLICATION FILED OCT. 30, 1913.
1,139,022.
Patented May 11, 1915.
2 SHEETS—SHEET 1.
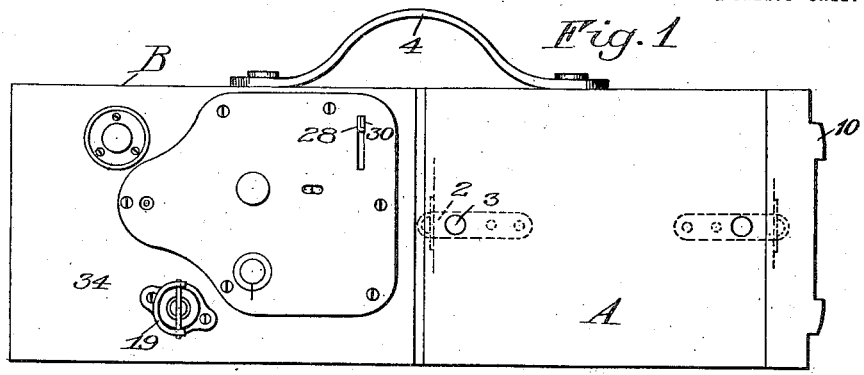
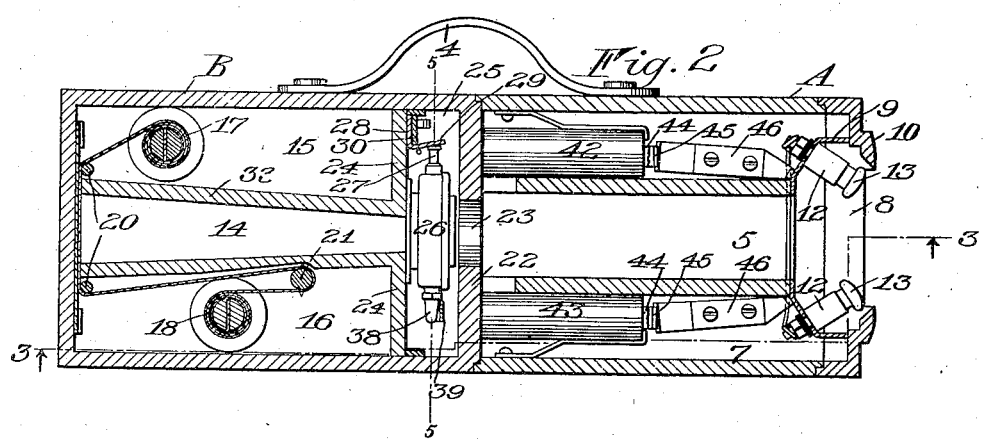
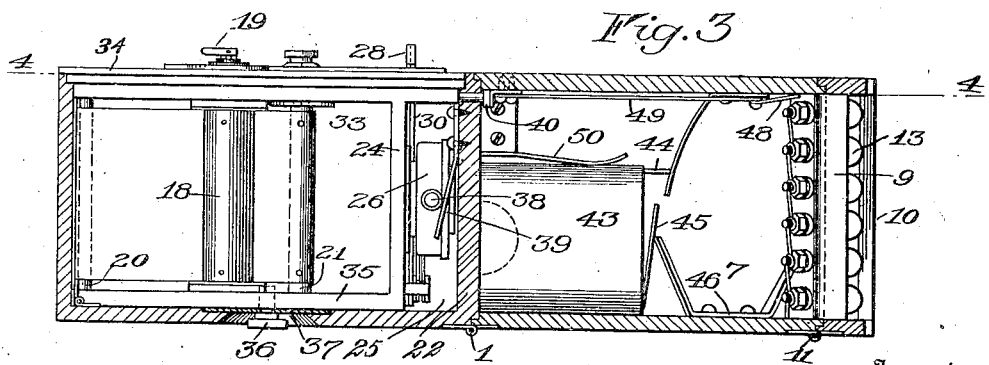
William F. Folmer, Inventor
Witnesses

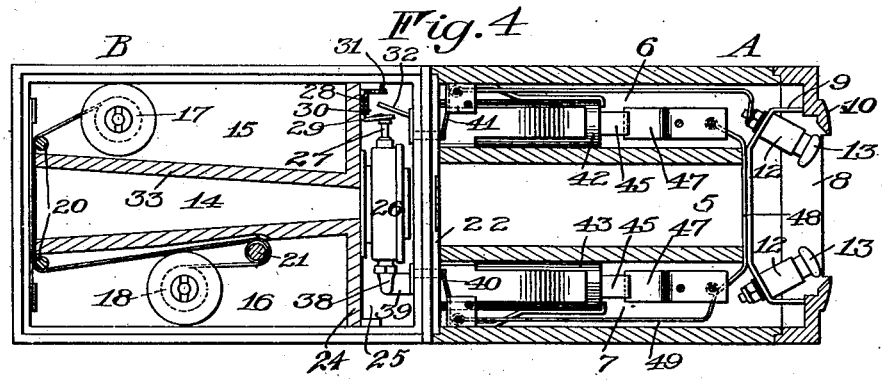
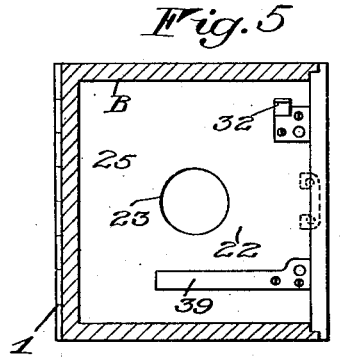
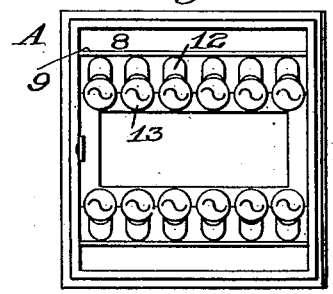
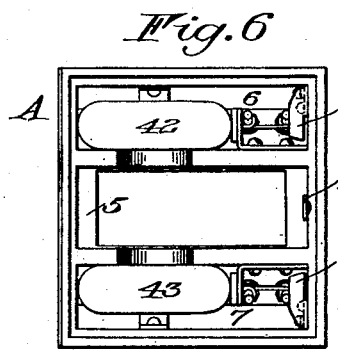
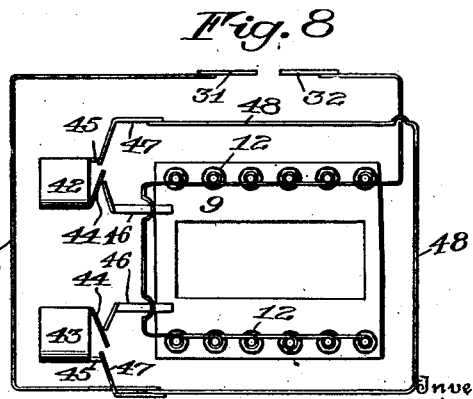

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CAMERA.

1,139,022.

Specification of Letters Patent.

Patented May 11, 1915.

Application filed October 30, 1913. Serial No. 798,226.

*To all whom it may concern:*

Be it known that I, WILLIAM F. FOLMER, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photography and more particularly photographic cameras, and it has for its object to provide a camera construction in which will be embodied an object illuminator for casting localized light upon the object to be photographed, the said camera being more particularly adapted for making record photographs of objects against which the camera can be closely held.

Further objects of the invention are to utilize electrical illumination for the above purposes with the source of current carried within the body of the camera and with the elements of the electrical equipment so arranged as to economize space and render them easily accessible.

To these and other ends the invention consists in certain improvements and combinations of parts all as will be hereinafter more fully described, the novel features being pointed out in the claims at the end of the specification.

In the drawings: Figure 1 is a side elevation of a camera constructed in accordance with and illustrating one embodiment of my invention; Fig. 2 is a longitudinal vertical central section therethrough; Fig. 3 is a horizontal section taken substantially on the line 3—3 of Fig. 2; Fig. 4 is another vertical section taken substantially on the line 4—4 of Fig. 3; Fig. 5 is a transverse section taken substantially on the line 5—5 of Fig. 2; Fig. 6 is a rear elevation of the front section of the camera; Fig. 7 is a front elevation of the front section, and Fig. 8 is a diagrammatic view of the electrical circuit arrangements.

Similar reference numerals throughout the several figures indicate the same parts.

The camera illustrated and constituting the present embodiment of the invention was designed more particularly for making photographic records of the readings of gas meters which fact, if kept in mind, will account for peculiar elements of form with respect to certain parts, but such matters are incidental to the spirit of the invention concerned and can be modified according to the use to which the camera is to be put without departing from the main inventive idea. In this view, the camera preferably comprises a casing formed in two parts, A and B, hinged together at one side, as indicated at 1 in Fig. 3, while at the other side they are held in coöperation by a suitable latch 2 (Figs. 1 and 6) that may be released by a press button 3 exposed on the exterior or beneath the flexible leather covering usually applied to the exterior of cameras. The respective ends of the carrying strap or handle 4 may be connected to the two sections, as shown.

The front section A comprises a centrally arranged elongated light passage 5 on either side of which are formed chambers 6 and 7 while at the forward end of the section is an illuminating chamber 8 from which the light passage leads. This illuminating chamber is constituted in the present instance partly by a metal plate 9 of the form shown and partly by a hood-piece 10 that may be hinged to the main casing as shown at 11 in Fig. 3, to give better access to the chamber on occasion and particularly when the lamps hereinafter mentioned are to be applied or removed. A plurality of lamp sockets 12 are mounted in the plate 9, there preferably being a row of them on each side for the purposes of the present camera, but in any circumstance, they should be arranged laterally of the light passage 5 so that no direct rays from the electric lamps or bulbs 13 that they support shall be received within the light passage 5 at such an angle as to traverse its whole extent and not be intercepted before reaching its rear end. These lamps may be of the ordinary filament type indicated in Fig. 7, and the interior of the chamber 8 may be white enameled to act as a reflecting medium. It will be noticed that the rear end of the front section A is open as are the chambers 6 and 7 and the light passage 5.

The rear section B comprises a centrally arranged exposure chamber 14 in alinement with the light chamber 5 upon either side of which exposure chamber are provided film chambers 15 and 16, the former for the feed roll 17 and the latter for the take-up or winding roll 18 which is provided with a winding key 19 (Fig. 3) on the exterior as usual. The film may be passed over the usual guiding and supporting rolls 20 at the rear of the exposure chamber 14 and a roll 21 over which it passes before reaching the winding roll is shown, but this is a driving device forming part of a shutter mechanism that I present in a separate application herefrom, Serial No. 798,227 filed October 30, 1913.

The front wall 22 of the rear section B which coöperates with the rear of the front section has an opening 23 in alinement with the light passage 5 of the latter and with the forward end of the exposure opening 14, but this wall in conjunction with a wall 24, closing the forward ends of the film chambers 15 and 16, otherwise forms a closed chamber 25 for a lens and shutter casing 26 mounted on the wall 24 to cover the forward end of the exposure chamber with its lens in a position obviously required.

A shutter may be of any convenient construction and a detailed description of it is not necessary here except to say that it embodies a plunger actuator 27 controlled by an operating lever 28 accessible from the exterior of the camera, as shown in Fig. 1, a lateral flange 29 being formed on the latter to engage the plunger, as shown in Figs. 2 and 4. The operating lever 28 is preferably mounted on the wall 24 in conjunction with a lever 30 which constitutes an electric switch and for this purpose is provided with a flange 31 which engages with a contact 32 (Figs. 4 and 5) on the wall 22 when the lever is depressed. The levers 28 and 30 interlock for joint movement for purposes connected more particularly with the shutter mechanism above referred to as constituting the subject matter of the separate application heretofore identified, it being important to say in connection with the present disclosure, only that the two levers are electrically connected to transmit current from the contact 32 when the switch lever is pressed down upon the same, through the latter, the shutter operating lever, and the shutter casing, the flange 29 on the shutter operating lever 28 being always in contact with the plunger 27. The flange 31 on the switch lever 30 is normally out of contact with the contact point 32 and the wall 24 upon which all of the shutter and switch mechanism is mounted as well as the partition walls 33 separating the film chambers 15 and 16 from the exposure chamber 14, are removable laterally from the body of the rear section B of the casing with a lateral exterior wall 34 of the latter. In fact the body of the rear section B constitutes merely a shell for the reception of this inner structure that comprises a separate inner wall 35 opposite the wall 34 and which, in connection with the latter, carries the journals that support the film spools 17 and 18. A thumb screw 36 rotatably mounted in a plate 37 screws into the wall 35 to draw this inner structure into position within the outer shell of the section B and to maintain it there. When the interior parts are inserted in this way, a projection 38 (Figs. 2, 4 and 5) automatically engages with a spring-leaf electrical contact 39 secured to the front wall 22 of the rear section. This contact 39, and the contact 32, are both extended through the wall 22, the former in position to engage a contact 40 in the chamber 7 of the front section A while the contact 32 similarly engages the contact member 41 in the chamber 6 all as shown in Fig. 4. This electrical connection is set up whenever the two sections A and B are in coöperative relationship.

In the chambers 6 and 7 are arranged dry batteries 42 and 43, respectively, the electrodes 44 of which engage contacts 46 on the walls of the chambers 6 and 7, electrically connected with the plate 9, and the contacts 45 of which engage contacts 47 also mounted on the walls of the said chambers, respectively. See the diagrammatic arrangement of Fig. 8 in connection with the other views. The contacts 47 are connected by the wire 48 so that the batteries are joined in multiple. The wire 49 connects the wire 48 to one set of terminals of all of the lamp sockets 12, the other terminals of which latter are in contact with the plate 9 so that the lamps are in parallel. It is believed that the circuit will be readily understood without being traced in this description, the switch lever flange 31 and its coöperating contact 32 being conventionally shown under the same reference numerals. The only parts of the circuit left out of Fig. 8 are the contacts 40 and 39 and the shutter casing 26 at one switch point and the contact 21 at the other. The batteries 42 and 43 are adapted to be inserted and removed through the open rear ends of the chambers 6 and 7 and their contacts, as will be seen, are of such a nature as to be automatically established or broken by these acts alone. They are tightly and noiselessly held against lateral displacement by spring clips 50 mounted on the inner walls of the chambers.

The operation of the device is thought to be obvious from the foregoing description. As before stated, the contacts 32 and 39 on the rear section B and the contacts 41 and 40 on the front section A, respectively, are automatically connected when the two sections are moved into coöperation and the circuit through the lamps is therefore closed at every point with the single exception of the switch lever 30. When the operating lever 28 is depressed to actuate the shutter for an exposure, the switch lever 30 is also operated by the same movement as previously mentioned and before the former has quite traveled far enough to cause the opening of the shutter, the flange 31 on the switch lever engages the contact member 32 and completes the electrical circuit causing a more or less prolonged flash of the lamps 13 while the exposure is being effected. The switch lever is preferably spring actuated so that it will return automatically when pressure is released to the position of Fig. 4 and break the circuit again whereby the current is allowed to flow and the illumination to continue only during the actual period of exposure.

As before stated, the particular camera illustrated is designed especially for taking the readings of gas meters which it does in an accurate and simple manner, but it is obvious that changes of form may be made to suit other work. It will be further noted that the rear section B could easily be adapted for a wide angle lens by moving the film rolls forwardly and giving a greater angle of divergence to the partitions 33. In use, the front opening of the hood-piece 10 is held close against the object insuring an absolutely true focus and at the same time protecting the lamps from contact. Attention is also called to the fact that the rear section B constitutes a complete camera in itself for other purposes when the front section A is swung to one side.

I claim as my invention:

1. The combination with a camera casing, comprising two separable sections, the front section embodying an elongated light chamber and the rear section an exposure chamber, of a laterally arranged object illuminating device carried by the front section at the forward end of the light passage and a lens and shutter mechanism carried by the rear section at the forward end of the exposure chamber and adapted to assume an alined position intemediate the light passage and exposure chamber when the two sections are in coöperation with each other.

2. The combination with a camera casing comprising two separable sections, the front section embodying an elongated light passage and a relatively laterally arranged battery chamber opening at the rear of said section and the rear section embodying an exposure chamber, of an object illuminating device arranged forwardly of the front section embodying an electric lamp, a battery in the battery chamber accessible from the rear of the front section when the sections are separated and electrical connections between the lamp and battery.

3. The combination with a camera casing comprising two separable sections provided with electrical circuit closing contacts arranged to coöperate when the sections are held together in operative relationship, the front section embodying a light passage and the rear section an exposure chamber alined therewith, of an object illuminating device embodying an electric lamp arranged forwardly of the front section, a battery carried by one of the sections, a switch carried by the rear section and an electrical circuit including the lamp, battery, switch and contacts.

4. The combination with a camera casing having a separate laterally removable inner structure carrying film supply and feeding devices and providing the exposure chamber of the camera, of an object illuminating device carried by the casing and embodying an electric lamp, a battery carried by the casing, and an electric circuit connecting the battery and the lamp and comprising two coöperating switch contacts one of which is on the casing and the other on the laterally removable inner structure, said switch contacts being moved into proper relationship when the last mentioned member is assembled within the casing.

WILLIAM F. FOLMER.

Witnesses:
 NELSON H. COPP,
 RUSSELL B. GRIFFITH.